United States Patent [19]

Penick

[11] 4,192,596
[45] Mar. 11, 1980

[54] CAMERA WITH IMPROVED SHUTTER ARRANGEMENT

[75] Inventor: Ib Penick, Prospect Heights, Ill.

[73] Assignee: Camera Plus, Inc., Fairfield, N.J.

[21] Appl. No.: 914,674

[22] Filed: Jun. 12, 1978

[51] Int. Cl.² ............................................. G03B 15/03
[52] U.S. Cl. ................................................... 354/142
[58] Field of Search ............... 354/142, 250, 251, 252, 354/253

[56] References Cited

U.S. PATENT DOCUMENTS

| | | | |
|---|---|---|---|
| 3,699,860 | 10/1972 | Winkler | 354/142 |
| 3,735,679 | 5/1973 | Winkler | 354/142 |
| 3,747,492 | 7/1973 | Penick | 354/142 |
| 3,785,260 | 1/1974 | Penick | 354/142 |

*Primary Examiner*—Monroe H. Hayes
*Attorney, Agent, or Firm*—Fitch, Even & Tobin

[57] ABSTRACT

A simple camera adapted for taking pictures with percussion-ignitable flashlamps. A striker element is cocked by movement against a spring and is retained in this position by spring-loaded sear lock. When the trigger is pivoted downward, the withdrawal of the sear lock causes the striker element to be driven in a straight line. An ear on the striker element hits a lug on a pivoted shutterblade and causes the shutterblade to swing against the bias of a light tension return spring to open the lens opening for predetermined time period until its return. When a flashlamp is employed, the firing pin portion of the striker element first contacts the torsion bar striker of the flashlamp, thus reducing the force subsequently imparted to the shutterblade and increasing the exposure time. The shutterblade is proportioned so that the lens opening is about 75 percent unobscured at the instant the flashlamp fires.

5 Claims, 9 Drawing Figures

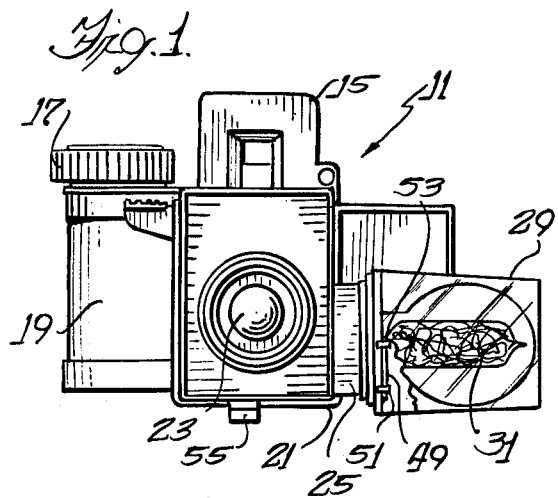
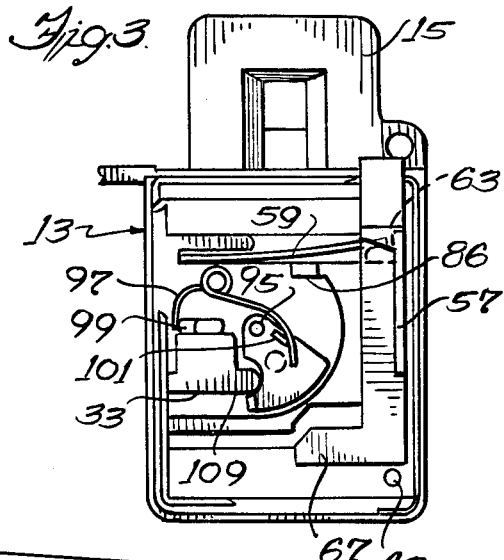
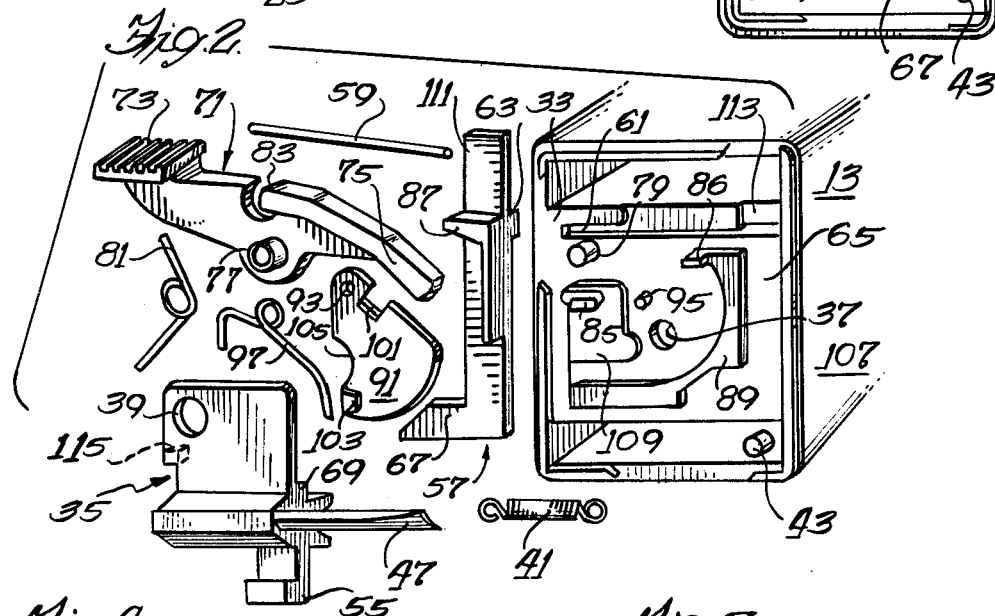
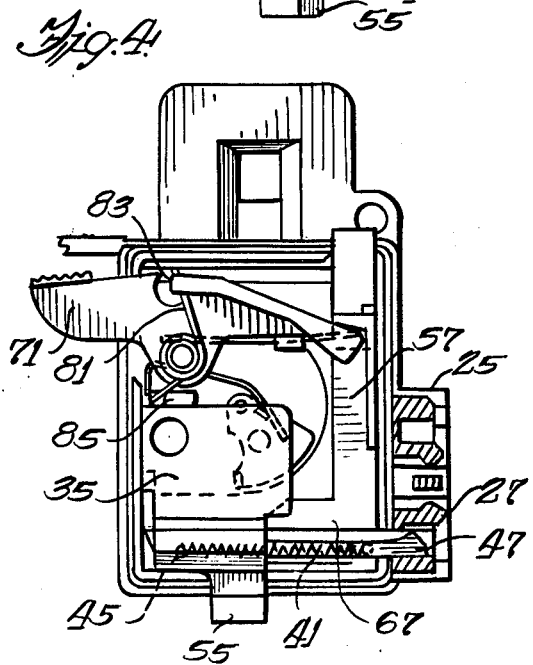
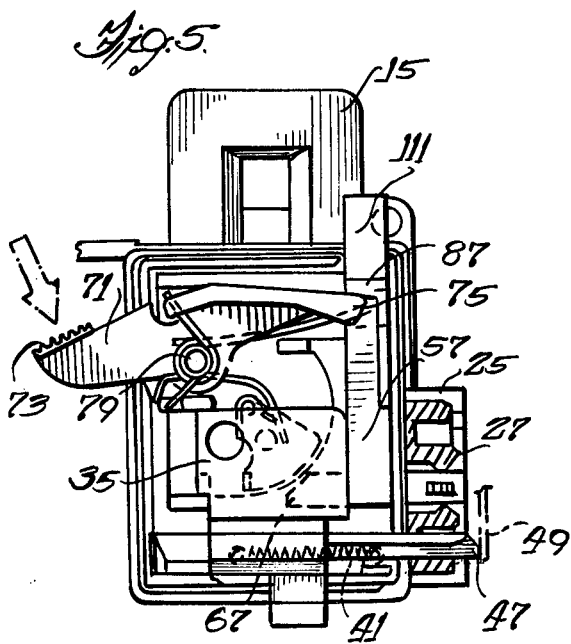

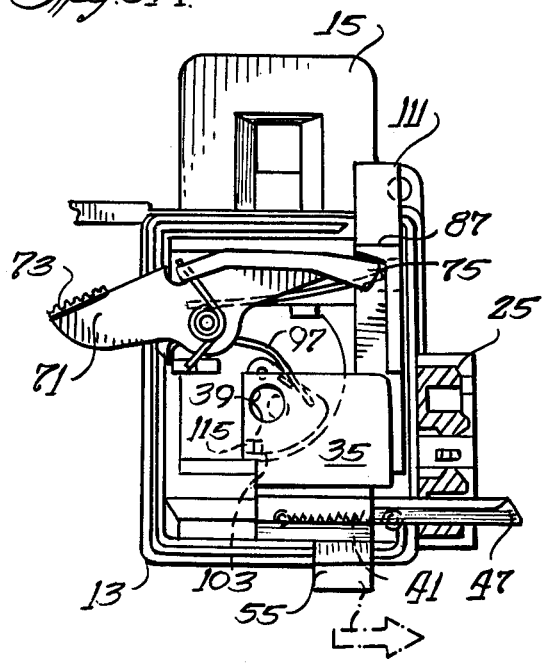
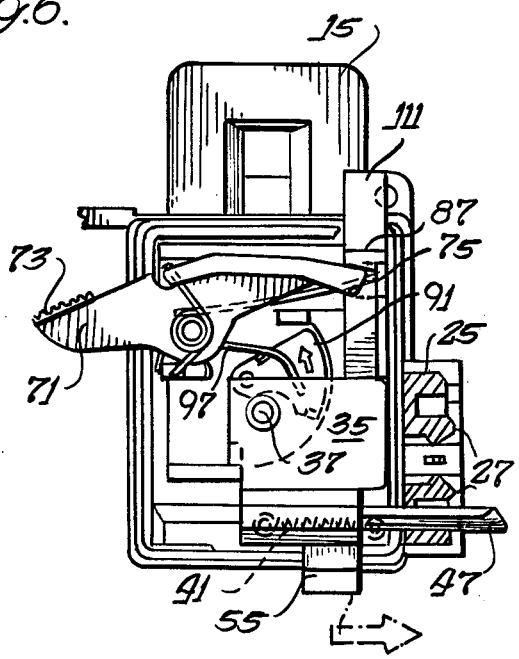
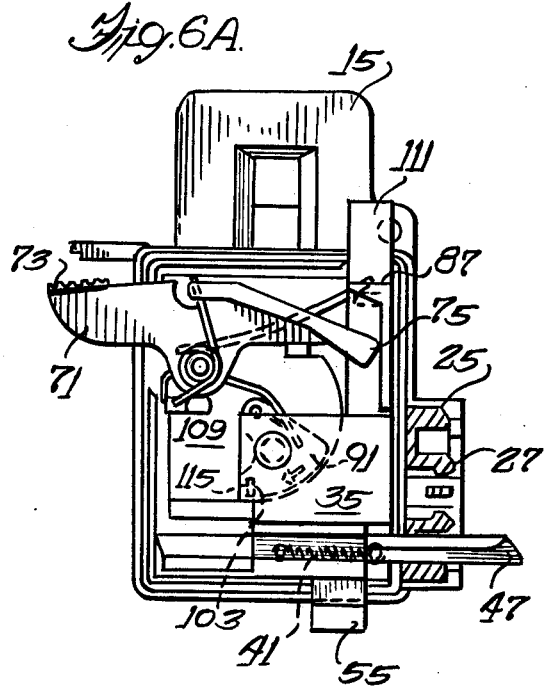
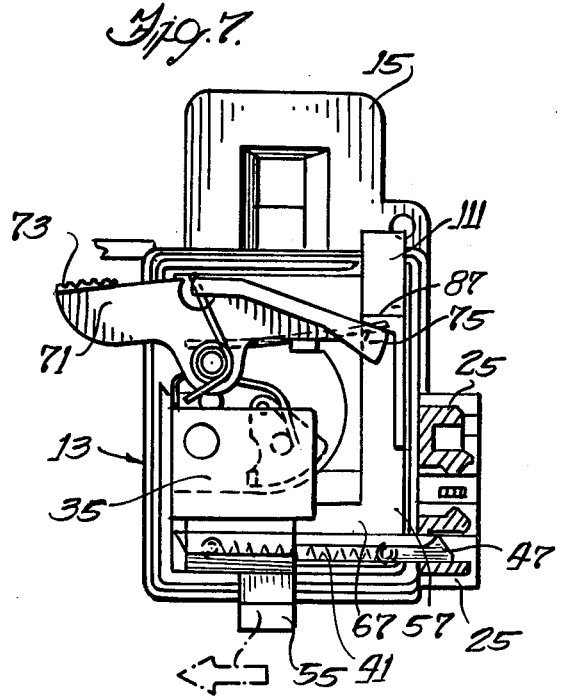

CAMERA WITH IMPROVED SHUTTER ARRANGEMENT

BACKGROUND OF THE INVENTION

The invention relates generally to simple cameras of the type which are adapted to use percussion-ignitable flashlamps. Applicant's own prior U.S. Pat. No. 3,747,492, issued on July 24, 1973, entitled "Camera Shutter and Flashlamp Igniting System", discloses a relatively inexpensive camera which incorporates a simple shutter and flashlamp ignition system. The system was particularly intended for incorporation into a low-cost camera and has proved relatively foolproof in operation by the general public.

SUMMARY OF THE INVENTION

The present invention provides an improved version of the arrangement illustrated in Applicant's prior patent wherein the pin which fires the percussion-ignitable flashlamp has a particularly reliable operation and wherein further improvement is made in the shutter arrangement. A simple mechanism is utilized to produce two different, but accurate, shutter speeds—one for daylight picture-taking and a slower shutter speed for flashlamp picture-taking.

BRIEF DESCRIPTION OF THE DRAWINGS

FIG. 1 is a front view of a camera embodying various features of the present invention;

FIG. 2 is an exploded perspective view showing the shutter and flashlamp operation mechanism of the camera illustrated in FIG. 1;

FIG. 3 is a front view of the camera in partially assembled condition;

FIG. 4 is a sectional view of the completely assembled camera taken so as to be generally similar to FIG. 3 and showing the shutter and firing mechanism in cocked position;

FIG. 5 is a view similar to FIG. 4 showing the mechanism in action following actuation of the trigger;

FIG. 5A is a view similar to FIG. 5 showing the mechanism at the instant of contact between the striker element and the shutter blade;

FIG. 6 is a view similar to FIG. 5, showing the striker element after it has completed its travel and showing the shutter blade in the film-exposing position;

FIG. 6A is a view similar to FIG. 6 which shows the shutter blade after it has returned to its aperture-blocking position and completed the exposure of the film; and FIG. 7 is a view similar to FIGS. 5 and 6 showing the mechanism being returned to its cocked position.

DESCRIPTION OF THE PREFERRED EMBODIMENTS

Illustrated in the drawings is a simple camera 11 of the box camera type which includes a main housing 13 which carries a view finder 15 and a film-advancing knob 17. The housing 13 is designed to be clipped to a film cartridge 19, such as a cartridge of 126 Instamatic film marketed by Eastman Kodak Company. Mounted on the front face of the housing 13 is a lens holder 21 which carries a central lens 23 and which is suitably permanently affixed along its rectangular periphery to the front of the housing.

The housing 13 and lens holder 21 are preferably molded from a suitable thermoplastic material. The lens holder 21 also carries a flashcube holder 25 which extends rearward therefrom, and in the assembled condition, about half of the flashcube holder lies laterally along side of the housing. The flashcube holder 25 includes a plurality of fingers 27 which are designed to join in snap-engagement with complimentary recesses in the base of a flashcube 29. The flashcube 29 is manually removed from the holder 25, rotated and replaced in the holder in order to sequentially position each of its four flashlamps 31 in the operable location.

The front wall 33 of the housing 13 is molded with a number of bosses, posts and lugs which serve to guide and retain the various portions of the shutter-activating mechanism and the springs which operate it. The front wall 33 of the housing and the lens holder 21 provide a compartment between them wherein the shutter mechanism is contained.

Slidably mounted in this compartment is a striker element 35 which is movable toward and away from the flashcube holder 25. A central opening 37 is provided in the front wall 33 of the housing (as best seen in FIG. 2) which is aligned with the lens and serves as the lens aperture. The striker element 35 is proportioned so as to obstruct the line of sight between the lens 23 and the aperture 37 when it is in the cocked position, as shown in FIG. 4. However, the striker element 35 contains an opening 39, larger in diameter than the lens aperture 37, which is moved into alignment with the lens aperture 37 during the time that film-exposure occurs, as best seen in FIGS. 5A and 6. The striker element 35 is spring-biased toward the flashcube holder 25 by a coil spring 41. One end of the coil spring 41 mounts a circular post 43 carried by the housing, whereas the other end of the coil spring is connected to a similar post 45 provided on the backside of the striker element.

The right-hand end of the striker element 35 is formed as a firing pin 47 which is proportioned, as best seen in FIG. 4, to be retracted inside the flashcube holder 25 when the mechanism is in the cocked position. As the striker element 35 moves from left to right, as illustrated in the drawings, the end of the firing pin 47 engages the torsion spring striker 47 of a standard flashcube which is already cocked and which is retained against movement by a lug 51. The end edge of the firing pin 47 pushes the torsion spring striker 49 past the end of the lug 51 and thus releases it, causing it to swing rapidly into percussive contact with the ignition-tube portion 53 which underlies the flashlamp 31, thereby igniting it.

The striker element 35 also contains an integral, depending reset handle 55 which travels in an open slot provided in the bottom of the housing 13. This handle 55 is used to slide the striker element 35 away from the flashcube holder 25 and thereby load the coil spring 41.

Slidably movable up and down, transversely of the path of movement of the striker element 35, is a sear lock 57. A simple torsion bar spring 59 urges the sear lock 57 to its lower lock position, depicted in FIG. 3. The left-hand end of the spring 59 resides in a generally horizontally extending cavity 61 which is formed in the front wall 33 of the housing, and the right-hand end of the spring rests in a notch (see FIG. 3) provided by the upper surface of a lug 63 formed on the rear surface of the upper portion of the sear lock 57.

The sear lock 57 slides in a vertical groove 65 provided in the front wall of the housing and is formed, at its lower end, with a horizontally extending detent 67 which engages the striker element 35 and prevents it from moving from left to right. Specifically, the left-hand edge of the detent 67 engages in integral offset 69 (see FIG. 2) on the rear side of the striker element and thus locks the striker element 35 in the cocked, biased position until the sear lock 57 is moved upward out of the way so that the offset 69 can slide below the detent 67.

In order to move the sear lock 57 upward out of its blocking location, a trigger 71 is provided which includes a finger-engaging pad 73 which is located outside of the compartment, and an actuator lever 75 which extends to contact the sear lock 57. The trigger 71 is formed with a central hole which is defined by a tubular hub 77 that fits over a round post 79 which protrudes from the front face of the housing front wall. The trigger 71 pivots on the round post 79, and a torsion spring 81 disposed on the hub 77 applies a bias to the trigger to urge it in a clockwise direction, as viewed in the drawing. As best seen in FIG. 4, one arm of the torsion spring 81 is received in a notch 83 provided in a central location at the inward end of the actuator lever 75, whereas the other end bears against a stud 85 which protrudes outward from the front wall of the housing. Thus, the spring 81 biases the trigger so that in the at-rest position its underside contacts the upper surface of a stud 86 which projects from the front wall, as shown in FIG. 4.

The sear lock 57 is formed with a lug 87 which protrudes outward from the front face and which is preferably molded as an integral part thereof. The actuator lever portion 75 of the trigger 71 is proportioned so that the free end thereof engages the underside of the lug 87 on the sear lock, as best seen in FIG. 5, and raises the sear lock 57, sliding it upward in the groove 65. The upward movement disengages the detent 67 on its lower end from its blocking relationship to the striker element, and upward movement is halted when the detent 67 abuts the underside of the boss 89 which partially defines the groove 65 in which the sear lock 57 slides.

A pivotally mounted shutter plate or blade 91 is provided which has a hole 93 near one end thereof that is pivotally received on a short circular post 95 which protrudes from the front wall of the housing, as best seen in FIG. 2. The shutter blade 91 is biased to the closed position, as shown in FIG. 3, by a light tension spring 97, in which position it blocks the lens aperture 37, as best seen in FIG. 3. This light tension spring, referred to as the shutter return spring, is mounted on the longer round post 79 which carries the trigger 71 and is located between the front wall 33 and the rear face of the trigger. One end of the shutter return spring 97 is located in a notch provided by a short lug 99 protruding from the front face of the housing, and the other end of the return spring bears against a small ear or protrusion 101 provided on the shutter blade 91 near its upper edge.

The shutter blade 91 is provided with a lug 103 on the lower end which projects forwardly from the front face and which causes the shutter to operate. The left-hand edge of the shutter blade is provided with an arcuate cut-out 105 located between the lug 103 and the pivot hole 93 which is proportioned to assure the desired exposure time is provided by providing clearance for the lens opening during film exposure (see FIG. 6). Other elements that come in to play in this determination are the mass of the shutter blade 91 and the spring constant of the light return spring 97 against the force of which the shutter blade is moved to open the lens aperture. The shutter blade travels in a recess 107 provided adjacent the front wall of the housing which is shaped to the shape of the shutter blade by the left-hand edge of the boss 89. The portion of the boss 89 at the upper end of the recess serves as a stop for the shutter blade 91 in the open position, and a low boss 109 having an arcuate edge engages the left-hand edge of the shutter blade in the cut-out region 105 to provide the at-rest position when the mechanism is cocked (as seen in FIG. 3).

The sear lock 57 has a portion 111 which extends upward through a slot provided in the upper wall of the housing 13 and serves as a flag to warn the user that the mechanism must be in the cocked position before the camera will be ready for taking a picture. Moreover, the bottom surface of the L-shaped lug 63, the upper surface of which provides the notch that receives the torsion bar spring 59, serves as a stop for the sear lock 57 in the cocked position. In this respect, the lug 63 travels in a recess 113 (FIG. 2) provided in the housing wall and engages the bottom wall of this recess to position the sear lock in the desired lower location to which it is biased by the torsion bar spring 59.

The operation of the camera mechanism is hereinafter described in the sequence that would occur as a picture is first taken and then as it is re-cocked to ready the camera for taking another picture. In the ready position, the mechanism appears as depicted in FIG. 4, with the striker element 35 in the far left-hand position and the coil spring extended. The trigger 71 is in the cocked position with the finger pad 73 essentially horizontal, and the sear lock 57 is in its lower lock position, with its flag portion 111 substantially retracted from view at about the level of the top of the housing.

Depression of the trigger pad 73, as shown by the arrow in FIG. 5, pivots the trigger 71 counterclockwise about the post 79 and causes the end of the actuator lever 75 to engage the underside of the lug 87 on the sear lock 57. The sear lock 57 slides upward in the channel 65 provided in the housing and causes the flag 111 to extend through the top wall of the housing. Movement of the sear lock continues until the detent 67 reaches the bottom edge of the boss 89, by which time disengagement between the detent and the offset portion 69 of the striker element 35 has occurred. At the instant of such disengagement, the coil spring 41 causes the striker element 35 to accelerate quickly moving from left to right, which initial stage of movement is depicted in FIG. 5.

FIG. 5A depicts a slightly further stage of such movement when an ear 115 (FIG. 2) on the rear side of the striker element 35 is just impacting against the lug 103 on the front face of the shutter blade 91. The force imparted to the shutter blade 91 by this impact is controlled by the appropriate selection of the coil spring 41 so that, taking in consideration the mass of the shutter blade and the force of the shutter return spring 97 to be overcome, a predetermined time of exposure for a daylight picture will be achieved, namely about 1/90th of a second.

As seen by comparing FIGS. 5A and 6, the striker element 35 has only a very short distance of left to right movement, remaining after the moment of impact, until it reaches its rest position against the right-hand edge of the housing, which is depicted in FIG. 6. During this final travel, the impacted shutter blade 91 is pivoting counterclockwise (as indicated by the arrow in FIG. 6) until its leading edge engages the edge of the boss 89, as depicted in FIG. 6. As earlier indicated, the opening 39 near the upper left-hand corner of the striker element is larger in size than the lens aperture 37, and by the time the shutter blade 91 has moved out of alignment with the lens aperture, the striker element 35 has reached a non-obscuring position.

As soon as its counterclockwise movement is halted, the shutter blade 91 swings clockwise, as indicated by the arrow in FIG. 6A, driven by the bias of the return spring 97 to a closed position where it obscures the alignment of the lens 23 and the lens aperture 37. In this position, the lug 103 rests against the ear 115 of the striker element 35. Release of the actuator pad 73 by the operator removing his finger causes the trigger 71 to immediately return to the clockwise position with the free end of the actuator lever 75 disposed well below the lug 87 of the sear lock. However, the sear lock 57 is prevented from moving downward at this time because the elongated upper edge of the offset portion 69 of the striker element 35 is disposed vertically below the detent 67 of the sear lock. Likewise, the flag portion 111 of the sear lock projects upward through the housing to remind the user that the camera must be re-cocked before it will be ready for taking another picture.

To re-cock the shutter mechanism, the re-set handle 55 is slid to the left, as depicted by the arrow at the bottom of FIG. 7, until the striker element 35 reaches the far left-hand position there depicted, with the coil spring 41 fully extended. As soon as the offset portion 69 of the striker element clears the bottom of the detent 67 of the sear lock 57, the torsion bar spring 59 drives the sear lock downward and into the lock position shown in FIG. 7, thus preventing further movement of the striker element until actuation of the trigger 71 has again pulled the sear lock upward. Once the film cartridge has been advanced by the operator's turning of the knob 17, the camera 11 is ready to take another picture.

The foregoing describes the taking of a daylight exposure, and when a percussion-ignitable flashlamp 31 is employed, there is only a slight difference. As depicted in FIG. 1, a standard flashcube 29 is installed which embodies four separate lamps 31, each of which has associated with it a fully cocked torsion bar striker 49. The location of the torsion bar striker 49 relative to the shutter mechanism is shown in dotted outline in FIG. 5. It illustrates that at an intermediate point of travel of the striker element 35 and well before its impact with the shutter blade lug 103, the far end of the firing pin 47 will engage the torsion bar 49 and push it out of engagement with the adjacent lug 51. As soon as the flashlamp striker is released, it pivots quickly and impacts against the percussion igniter 53 to fire the flashlamp.

Of course, the striker element 35 is rapidly moving to the right as the torsion bar striker is swinging and impact of the ear 115 with the lug 103 of the shutter blade occurs. The spring constant of the shutter return spring 97 is preferably chosen so that, at the instant of the firing of the flashlamp 31, the shutter blade 91 is moving toward its second, or fully counterclockwise position, and that it has already traveled a sufficient distance so that the lens aperture 37 is at least about 75 percent unobscured by the shutter blade—the critical region of which is the trailing arcuate edge of the cutout area 105. This location would lie between the views depicted in FIGS. 5A and 6. Even more importantly, the engagement of the firing pin 47 of the striker element with the torsion bar 49 so as to offset it from the associated holding lug 51, has reduced the force which the striker element 35 impacts against the shutter blade lug 103. Thus, when an unignited flashlamp 31 has been installed in the holder 25 in line with the firing pin 47, the shutter blade 91 will be swung counterclockwise with less force than if there were no torsion bar striker 49 which the firing pin had to displace. Accordingly, the speed at which the shutter blade 91 travels as it swings counterclockwise will be slower, the amount of rebound from the stop will be less and the time of exposure will be desirably longer. Thus, the illustrated construction effectively takes advantage of the decrease in impact force which results from the presence of the cocked torsion bar striker 49 in the path of the firing pin and by appropriately selecting the spring constant of the shutter return spring 97 and the mass of the shutter blade 91, the time of exposure can be regulated to be about 1/90th of a second for a daylight picture and about 1/50th of a second for a flashlamp picture. Accurate achievement of these shutter speeds in a simple camera such as this, both with and without a percussion-ignitable flashlamp, is considered to be a substantial step forward.

Although the invention has been described with respect to a certain preferred embodiment, it should be understood that various changes and modifications as would be obvious to one having the ordinary skill in this art may be made without departing from the scope of the invention which is defined solely by the claims appended hereto. For example, although certain preferred types of springs are illustrated, other types of comparable biasing means may be employed. Particular features of the invention are emphasized in the claims which follow.

I claim:

1. A camera adapted for use with percussion-ignitable flashlamps, which camera comprises a housing, a lens opening in said housing, a striker element mounted for movement in a straight line direction within said housing between a first loaded position and a second exposed position, reset means on said striker element for permitting it to be manually moved from said second position to said first position, a spring biasing said striker element to said second position, a spring-biased sear lock engageable with said striker element to hold it in the loaded position against the action of said first spring, a trigger pivotally mounted within said housing, a trigger spring biasing said trigger to a ready position, said trigger having a part extending exterior of the housing and having an actuator portion for moving said sear lock so as to release said striker element, said striker element having a pin portion which is aligned with an opening in said housing adjacent a socket for receiving a percussion-ignitable flashlamp, said pin being proportioned so as to protrude through said aligned opening and actuate said flashlamp when said striker element is moving from said first position to said second position, a pivotally mounted shutter plate, spring means biasing said shutter plate to an at-rest position where it blocks said lens opening, lug means on said shutter plate projecting toward said striker element, an ear on said striker element projecting toward said shutter plate, said ear being positioned to hit said lug means and cause said shutter to pivot to a position where it no longer blocks said lens opening and thus allows film exposure to occur, said spring means having a spring constant such as to maintain said shutter plate in such a non-blocking position for a predetermined amount of time, and means for halting movement of said striker element in said second position which is located so that said returning shutter plate is halted in an intermediate position by said lug resting against said ear, said shutter plate being proportioned such that it blocks said lens opening in said intermediate position.

2. A camera in accordance with claim 1 wherein said shutter plate is formed with a cut-out region located between said pivot point and said lug.

3. A camera in accordance with claim 2 wherein said striker element contains an opening larger in size than said lens opening which is aligned therewith in said second position.

4. A camera in accordance with either claim 1 or claim 2 wherein said pin is proportioned so as to engage the torsion bar portion of a percussion-ignitable flashlamp prior to engagement of said ear with said shutter plate lug whereby a desired shutter speed is achieved for flashlamp operation and a faster shutter speed is achieved for daylight operation.

5. A camera in accordance with claim 1 wherein said spring constant is such that at the instant of firing of said flashlamp said shutter plate is moving toward said second position and with said lens opening at least about 75 percent unobscured by said shutter plate.

* * * * *